United States Patent [19]

Nied

[11] Patent Number: 4,514,612
[45] Date of Patent: Apr. 30, 1985

[54] COMPOSITE RESISTANCE SPOT WELDING ELECTRODE

[75] Inventor: Herman A. Nied, Ballston Lake, N.Y.

[73] Assignee: General Electric Company, Schenectady, N.Y.

[21] Appl. No.: 473,833

[22] Filed: Mar. 9, 1983

[51] Int. Cl.³ .............................................. B23K 11/30
[52] U.S. Cl. .................................... 219/119; 219/86.25
[58] Field of Search ...................... 219/119, 78.01, 80, 219/86.1, 86.31, 86.25

[56] References Cited

U.S. PATENT DOCUMENTS

| | | | |
|---|---|---|---|
| 1,176,614 | 3/1919 | Stanley | 219/119 |
| 1,982,098 | 11/1934 | Hartmann | 219/119 |
| 2,180,396 | 11/1939 | Burke | 219/119 |
| 3,363,086 | 1/1968 | Ecklund et al. | 219/119 |
| 3,592,994 | 7/1971 | Ford | 219/119 |
| 3,689,731 | 9/1972 | Miller | 219/119 |
| 3,909,581 | 9/1975 | Stone et al. | 219/120 |

*Primary Examiner*—Roy N. Envall, Jr.
*Assistant Examiner*—Catherine M. Sigda
*Attorney, Agent, or Firm*—Donald R. Campbell; James C. Davis, Jr.; Paul R. Webb, II

[57] ABSTRACT

A composite electrode configuration prevents mushrooming of resistance spot welding electrodes due to local high contact pressure and current densities. For a truncated electrode, an outer sleeve of high strength and high electrical resistivity material is attached to the end of the electrode and takes the high contact stress at the edge of the flat end face. A spherical end electrode has a plug of higher strength material in the center where the highest contact stress exists, and the outer sleeve reduces the joule heating effect. A transverse insulating spacer is a thermal and electrical barrier.

2 Claims, 9 Drawing Figures

COMPOSITE RESISTANCE SPOT WELDING ELECTRODE

BACKGROUND OF THE INVENTION

1. Field of the Invention

The present invention relates to electrodes for use in resistance spot welding, and in particular to a composite electrode incorporating specially configured separate strength and insulation members which substantially increase the useful life of the electrode by mitigating the effects of the high contact pressures and high current densities encountered.

2. Description of the Prior Art

The problems associated with maintaining good electrode structural integrity and operating performance during resistance spot welding have received a good deal of attention over the years. This is so because of the critical role electrodes play in assuring consistant weld quality, and because of the severe operating requirements placed on the electrodes. Electrodes are required to: conduct the proper welding current to the workpieces; transmit the amount of compressive force to the workpiece needed to produce a satisfactory weld; and rapidly dissipate the heat from the weld zone on completion of the weld cycle. Therefore, during the welding operation, the electrodes are subject to great compressive stresses at elevated temperature, and must be regularly dressed and periodically replaced. Because the current conducted to the work piece must remain localized within a fixed area, the electrodes must resist the stresses without excessive deformation. The electrode force, in addition to forging the heated workpieces together, influences the passage of current to the localized area.

The face of a spot welding electrode contacts the workpiece directly above and/or below the point of fusion, and this small area is subjected to repeated application of high temperature and pressure. Shape and dimensions of the electrode tips are affected by mechanical wear and deformation or 'mushrooming', at a rate depending on tip material and design, operating temperature, rates of heating and cooling, and welding force. Also, the possibility of 'pick-up' and alloying with the workpiece is attendant to the deformation problems—all of which tend to seriously reduce electrode life and weld quality.

This full range of electrode problem areas have been addressed by a variety of approaches, none of which have been entirely successful. As a result, there has been a continuing and serious effort to improve the service life of electrodes in daily use. The ever-increasing welding applications in which electrodes are called upon to perform manifests the need for an improved electrode capable of withstanding the effects of localized high contact pressures and high joule heating resulting from localized current densities. The composite electrode disclosed in the present invention is directed to providing such a needed device.

SUMMARY OF THE INVENTION

It is therefore a primary object of the present invention to provide improved composite electrodes for resistance spot welding.

Another object of the present invention is to provide a resistance spot welding electrode having means for controlling and improving the thermal and compressive stress environment in which the electrode operates, thereby increasing its service life.

A further object of the present invention is to provide a reinforced, composite spot welding electrode which minimizes mushrooming and improves weld quality.

These and other objects are achieved in an improved composite resistance spot welding electrode having a significantly longer useful life by incorporating uniquely shaped high strength elements and insulating elements into copper-base alloy and other electrodes. The shape and locations of the stress/heat mitigating members are determined advantageously from data derived by finite element analysis of electrodes, which shows that the maximum contact pressure exists at the periphery of the circular end face of a truncated electrode, and at the center of a spherical end electrode.

The composite electrode is comprised of base and stem portions, an outer sleeve of high strength and high resistivity material positioned around the stem portion, and a transverse insulating spacer on the stem portion between the base portion and outer sleeve to provide a thermal and electrical barrier therebetween. In the truncated end electrode the outer sleeve takes the high contact stress at the corner; the magnitude of the current density is reduced and the joule heating effect at that location. The spherical end electrode has a higher strength material plug inserted in a central axis cavity that bears on an insulation spacer. The outer sleeve is attached in the same manner and reduces the local joule heating effect, though the contact stresses are low here.

BRIEF DESCRIPTION OF THE DRAWINGS

Additional objects and advantages of the invention will become apparent to those skilled in the art as the description proceeds with reference to the accompanying drawings wherein.

DESCRIPTION OF THE PREFERRED EMBODIMENTS

Figure 1:
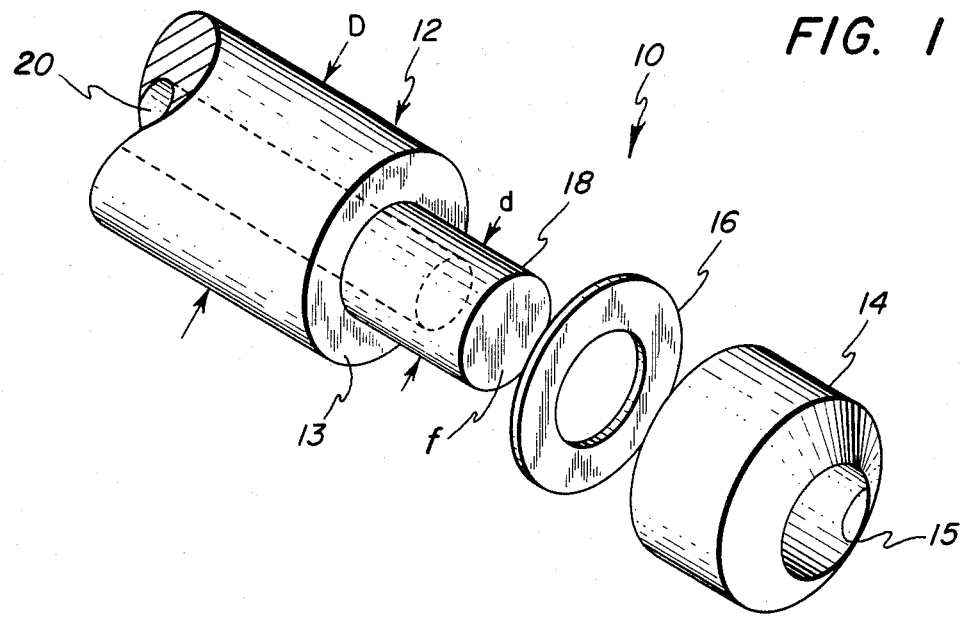
FIG. 1 is an exploded view of a composite resistance spot welding electrode embodying the principles of the present invention.

Referring now to FIG. 1 there is shown an exploded perspective view of a composite resistance spot welding electrode embodying the features of the present invention. The composite electrode 10 is shown illustratively as being of the water-cooled, truncated end type, and comprises a central body member 12 having an outer sleeve element 14 fitted about its proximal end, the two components being separated along a transverse plane by a thin, washer-like electrical/thermal insulating spacer 16. The body member 12 may be made of copper base alloys, or other well-known and conventional materials, and is configured as an elongated cylinder having a diameter "D" over most of its length with a reduced diameter "d" along a short stem portion 18 terminating in an electrode circular end face "f". Conventionally, a water cooling channel 20 is centrally located (along the longitudinal axis) within the body member 12.

Figure 2:
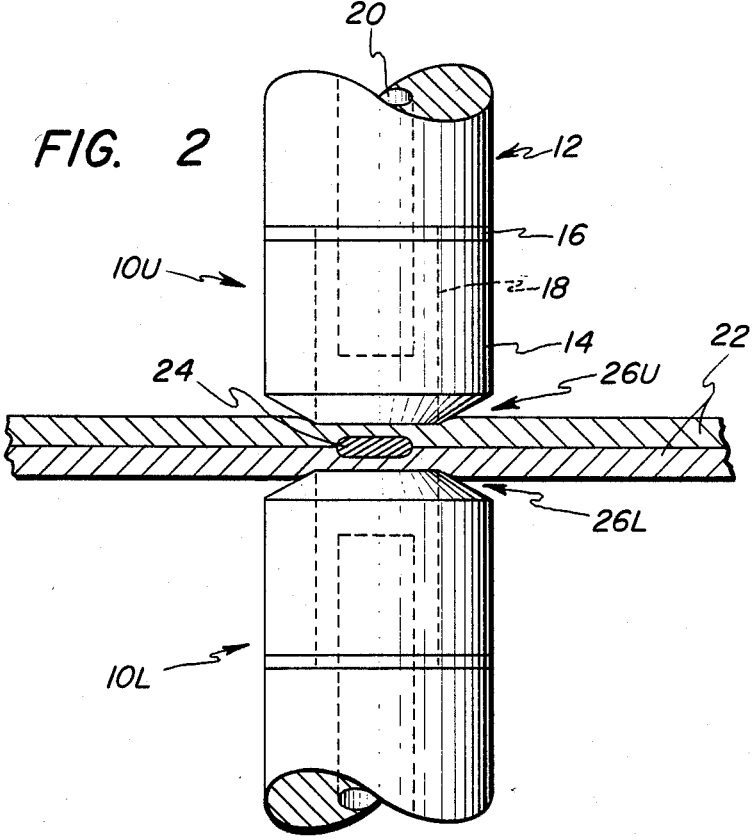
FIG. 2 is a schematic view of a pair of composite resistance spot welding electrodes in position for making a typical spot weld on thin metal workpieces.

The outer sleeve 14 is made of material having a high strength and high specific resistivity, and when assembled fits snugly around the stem portion 18 of the body member 12. The insulating spacer 16 may be made from any suitably strong material having good thermal and electrical insulating properties, including such materials as Teflon ® tetrafluoroethylene, ceramic, and like synthetics. When fully assembled, as shown in FIG. 2, one face of insulating spacer 16 bears on shoulder 13 of body member 12, while the outer sleeve 14 bears against the other face of insulating spacer 16. The outer sleeve 14 is securely attached to the stem portion 18 and has a length such that the end face "f" of stem 18 is flush with the open circular aperture 15 at the end of the sleeve frustum. Thus, in use, the flat copper end face "f" will bear fully on the workpiece during welding while the lower periphery of the outer sleeve 14 takes the high contact stresses which develop around the periphery of the face "f". Due to the barrier produced by the insulating spacer 16, the outer sleeve 14 is effectively isolated from the high joule heating experienced at the edge by the electrode of conventional design.

Referring briefly to FIG. 2, a pair of composite electrodes constructed according to the present invention are shown in position for use in a typical spot welding application or operation. Sheet metal workpieces 22 are held together under compressive force by upper and lower electrodes 10U and 10L, respectively, and the workpieces are shown fused at their faying surfaces by a weld nugget 24. During the squeeze phase of the welding cycle, the compressive force needed to produce high contact pressures and to effect a good quality weld cause the electrodes to indent the workpieces as shown (not to vertical scale) in the regions 26U and 26L on the outer workpiece surfaces. This axial loading action leads to electrode contact pressures which are highly non-uniform.

Figure 3A:
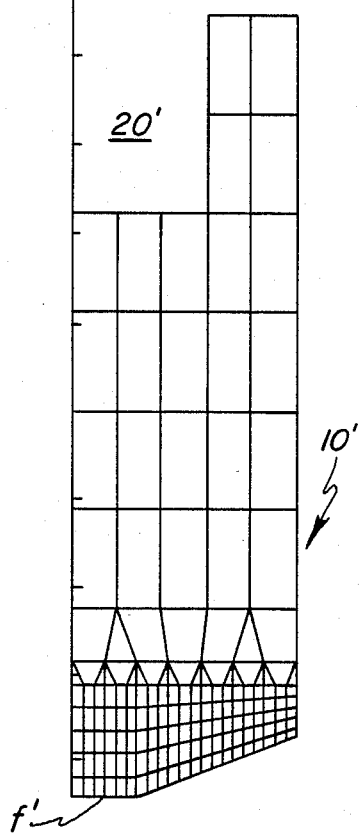
FIGS. 3A-3C illustrate the results of finite element structural analysis on a conventional electrode showing the resulting characteristic pressure distributions developed within a truncated electrode.
Figure 3B:
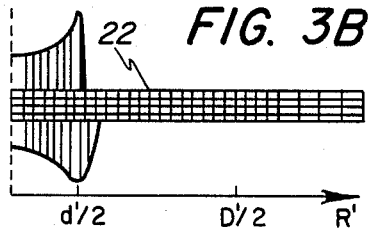
Figure 3C:
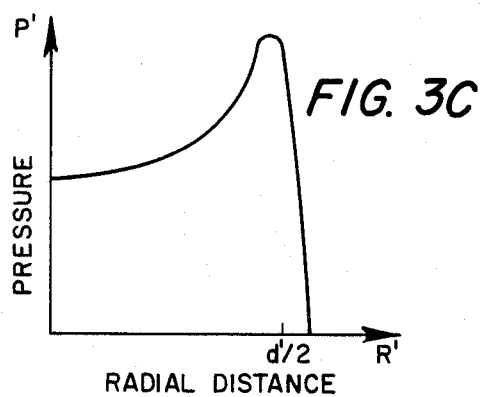

FIGS. 3A-3C refer to characteristic pressure distributions for a conventional truncated electrode 10' as obtained from the results of finite element structural analysis. The finite elements used for analysis are depicted in the first two figures. The non-uniformity of the pressure distribution and the location of the maximum stress on the electrode become readily apparent upon study of the results illustrated. FIG. 3A shows a finite element electrode about the center line (in modified cross-section), and FIG. 3B depicts the corresponding pressure distribution on the upper sheet during the squeeze phase. For both figures, only half of the electrode 10' (to the right of the centerline CL) and the resulting axially symmetric pressures are shown, the other half exhibiting the mirror image of the data items shown, which generally exhibit radial symmetry. The horizontal axes of both FIGS. 3A and 3B are drawn to the same scale. For ease of correlation with the composite electrode 10 previously described, those portions of a truncated end electrode 10' which have a normal correspondence to the composite electrode 10 are labelled with corresponding primed numbers.

In FIG. 3B, which shows the workpieces, contact stress between electrode and workpiece, and contact pressure between workpieces, it is noted that the maximum pressure exists at the periphery of the circular end face of the electrode, which generates a high stress in the corner of the electrode. This pressure (P') versus radial position (R') data is plotted in simpler and clearer form in FIG. 3C to emphasize the substantial peak pressure encountered at the d'/2 location in the radial direction. Consequently, this corner of the truncated electrode tends to become plastically deformed, giving rise to the undesirable mushrooming and rapid wear. This condition is compounded further by current density singularities which occur between the electrode and the workpiece at the outer edge of the contact between the two. Analysis has shown that this region is hot due to joule heating and gives rise to burn rings in the workpiece. The localized deformation and heating produce the deterioration of copper resistance spot welding electrodes, which lead to poor welds unless the electrodes are regularly dressed or replaced.

Figure 5:
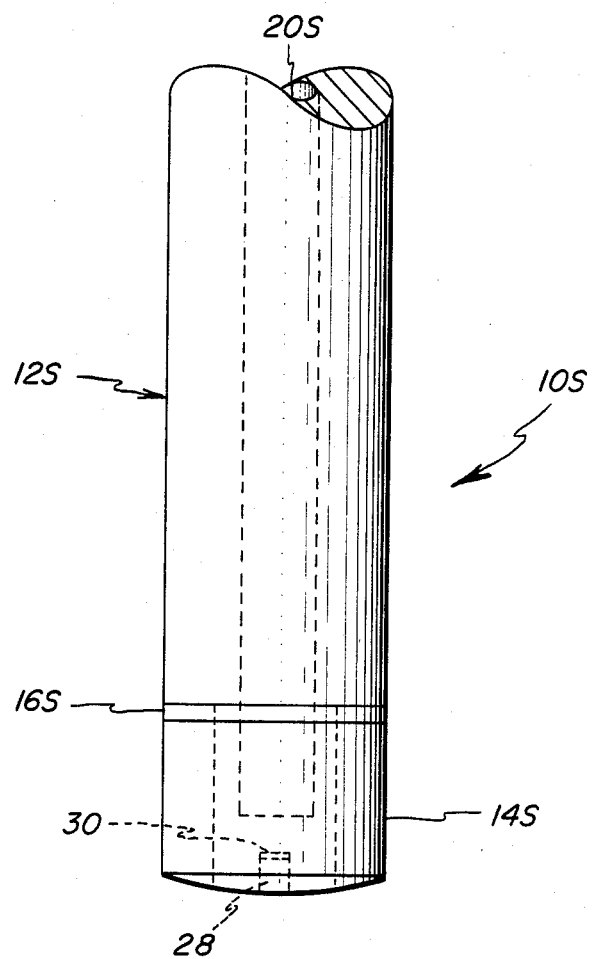
FIG. 5 is an alternate embodiment of a composite resistance spot welding electrode configured for use with spherical end electrodes.

In view of the above analysis, it becomes clear that the improved composite electrode of the present invention disclosed in FIGS. 1 and 2 is ideally configured to substantially reduce both the deformation and heat concentration on the edge of the electrode. Referring back to FIGS. 1 and 2 with the result of FIGS. 3A-3C in mind, the outer sleeve 14 is designed to absorb the high contact stress which develops at the corner location, precluding the copper end face "f" from responding in deformation. In addition, the high specific resistance of the outer sleeve 14 in combination with the transverse thermal and electrical insulation provided by the insulating spacer 16 channels the bulk of the welding current flow into the central region of stem portion 18 such that the magnitude of the curreny density singularities at the electrode corner is significantly reduced. Therefore, the adverse effect of joule heating at that critical electrode location and the previously compounding effect of heat and pressure is substantially eliminated. Outer sleeve 14 is made of a material possessing high strength, high electrical resistance, and low thermal conductivity, such as alloys and ceramics. Sintered carbides, in particular beryllium carbide and titanium carbide, and refractory carbides and silicon carbides, are suitable. In FIG. 5, outer sleeve 14S and plug 28 are of the same.

Figure 4A:
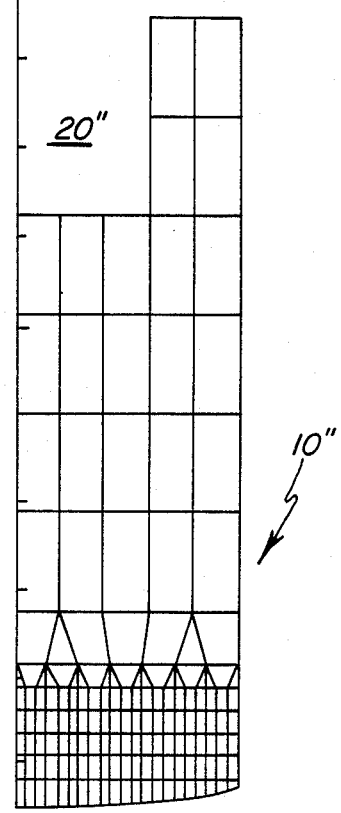
FIGS. 4A-4C illustrate the results of finite element structural analysis on a conventional electrode showing the resulting characteristic pressure distributions developed within a spherical end electrode.
Figure 4B:
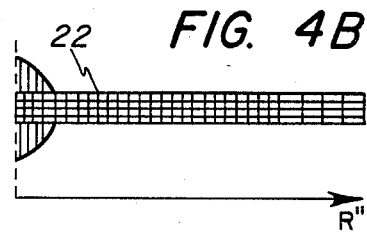
Figure 4C:
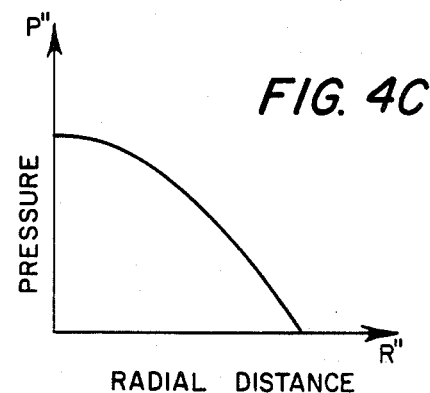

FIGS. 4A-4C depict data analogous to that of FIGS. 3A-3C for a spherical end electrode. As with FIGS. 3A-3C, only half of the data items (electrode centerline radially outward) are illustrated and the portions of a spherical end electrode 10" which find a nominal counterpart to the composite electrode 10 of FIG. 1 are labelled with corresponding double primed numbers. FIGS. 4A and 4B are plotted to a common horizontal scale factor, and FIG. 4C is a simplified exposition of the axial electrode pressure distribution (P") versus radial position (R") for the spherical end electrode analyzed. For this electrode geometry, there is no easily recognizable face "f" boundary so that the graphical data of FIG. 4C lacks a specific radial distance (such as d'/2 of FIG. 3C) on the horizontal R" axis. Even so, FIGS. 4B and 4C clearly show that the maximum contact pressure occurs at the center of the electrode, thereby producing the highest stress and tendency towards mushrooming in the highly localized area immediately surrounding the electrode central, or longitudinal axis. Similar current density concentrations are co-located. To meet the plastic deformation and heating problems associated with this electrode geometry, an alternate embodiment of a composite spot welding electrode according to the present invention is needed.

Referring now to FIG. 5, there is shown the alternative embodiment of a composite electrode configured for use with spherical end electrodes. For the embodiment of FIG. 5, the suffix "S" (for spherical end) will indicate an electrode component which is nominally the equivalent of the correspondingly numbered component shown in FIG. 1. Thus, the composite electrode 10S is shown illustratively as being water cooled, and basically comprised of a central body member 12S having an outer sleeve element 14S fitted around its proximal end, the two components separated by a thin, washer-like insulating spacer 16S, the materials employed in the overall composite geometry, except for the spherical end face, being the same as previously described. In addition to the outer sleeve 14S, which has a flat end face positioned against the spacer and a spherical end face, an additional high strength and high electrical resistivity central plug element 28 is securely fitted into a cavity formed into the electrode face at the central axis location. A thin insulating spacer 30 is fitted behind the plug 28 within the central cavity, and the elements making up the electrode face are then dressed to take on the desired spherical shape.

Since the highest contact stress exists at the electrode center as shown in FIGS. 4B and 4C, the higher strength material of plug 28 meets that stress preventing the high tendency to deformation in that region. The insulating spacer 30 reduces the localized current at the electrode face central region, thus aiding the effect of the plug 28 and reducing the electrode face deformation. The outer sleeve 14S which is attached in the same manner as with the truncated end electrode also reduces the local joule heating effect, although the contact stresses will be low at that particular location for this electrode configuration.

In conclusion, an improved resistance spot welder is needed to assure high quality welds, and in that system it will be necessary to have electrodes that hold their shape to prevent poor welding. The life of electrodes is substantially increased by these composite configurations.

Although the invention has been described in terms of selected preferred embodiments associated specifically with a truncated end electrode and a spherical end electrode, the invention should not be deemed limited thereto. Clearly, other embodiments and modifications will readily occur to those skilled in the art in connection with other electrode types and other sleeve, plug, and insulation element configurations. It is, therefore, to be understood that the appended claims are intended to cover all such modifications as fall within the true spirit and scope of the invention.

What is claimed is:

1. A composite resistance spot welding spherical end electrode comprising:

a one-piece cylindrical electrode having a base portion of a first diameter and an axial stem portion of a second reduced diameter providing a shoulder on said base portion, said stem portion terminating in a spherical end face that has a central axis cavity;

a first washer-shaped insulating spacer placed over said stem portion against said shoulder and a second insulating spacer interiorly positioned within said central cavity;

a high strength, high electricl resistivity plug in said central cavity that bears on said second insulating spacer and has an exterior spherical end face;

a high strength, high electrical resistivity annular outer sleeve on said stem portion which has a flat end face positioned against said first insulating spacer and a spherical end face that forms a smooth continuous surface with said stem portion and plug spherical end faces;

said plug absorbing the peak contact pressure built up on the electrode face central region during a weld operation and said second insulating spacer reducing the localized current and joule heating at that location, whereby plastic deformation and deterioration of the electrode end face is substantially mitigated.

2. The composite electrode of claim 1 wherein said one-piece base and stem portions are of copper-base alloy and said plug and outer sleeve are made of carbide material.

* * * * *